United States Patent [19]

Doyle

[11] 4,342,128
[45] Aug. 3, 1982

[54] WIPER DEVICE FOR REMOVAL OF SNOW AND LIQUID FROM SKI GLASSES OR GOGGLES

[76] Inventor: Thomas P. Doyle, 3872 Highway 49, Placerville, Calif. 95667

[21] Appl. No.: 190,749

[22] Filed: Sep. 25, 1980

[51] Int. Cl.³ .............................................. B60S 1/14
[52] U.S. Cl. .................................. 15/245; 15/250.36; 40/582
[58] Field of Search ...................... 15/105, 236 R, 245, 15/250.36, 250.42; 40/582, 612, 594; D32/40, 41, 42, 51, 52

[56] References Cited

U.S. PATENT DOCUMENTS

| 2,628,712 | 2/1953 | Ford | 15/236 R X |
| 2,676,348 | 4/1954 | Brody et al. | 15/245 X |
| 3,541,629 | 11/1970 | Quinlan et al. | 15/250.42 |
| 3,936,567 | 2/1976 | Vesely | 40/582 |

FOREIGN PATENT DOCUMENTS

| 130275 | 11/1948 | Australia | 15/245 |
| 924051 | 2/1955 | Fed. Rep. of Germany | 15/245 |
| 99733 | 6/1923 | Switzerland | 15/245 |

*Primary Examiner*—Peter Feldman
*Attorney, Agent, or Firm*—Mark C. Jacobs

[57] ABSTRACT

A device is disclosed for the removal of snow and other debris from the surface of glasses or goggles as worn by skiers. The device includes a handle portion having a wiper blade secured thereto for cleaning the lenses of the glasses or goggles. To prevent loss, an optional neck chain or leather tether is disclosed.

2 Claims, 7 Drawing Figures

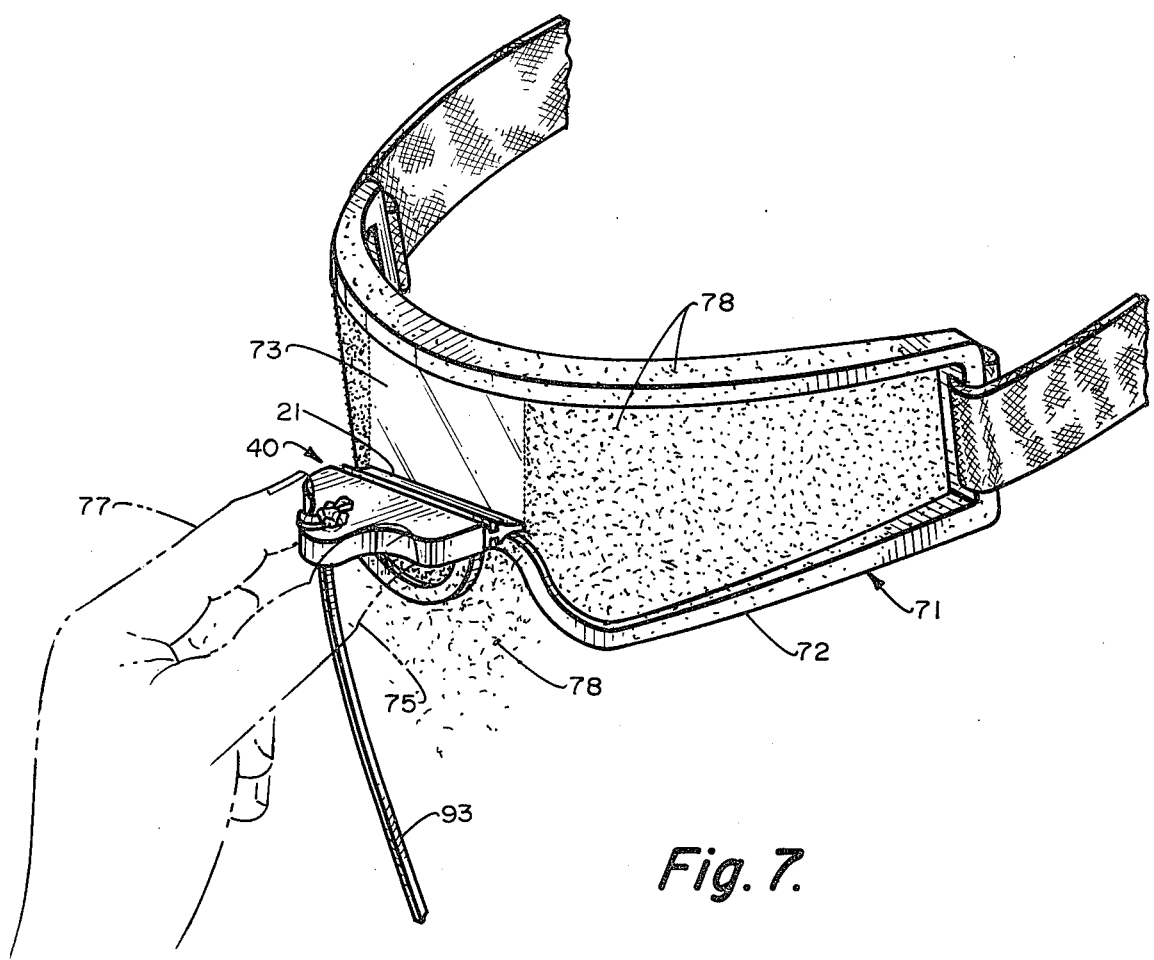

WIPER DEVICE FOR REMOVAL OF SNOW AND LIQUID FROM SKI GLASSES OR GOGGLES

BACKGROUND OF THE INVENTION

One of the problems experienced by hunters and skiers alike is the fact that snow can accumulate on glasses and goggles, and depending on the ambient temperature-even a light glaze of ice could form. Up until now, there has been no simple device that is readily available at a moment's notice to the skier or hunter to clean his goggles or glasses.

It is an object therefore, of this invention to provide such a device.

One object thus is to provide a lightweight easy to use, snow removal device for hunters and skiers.

Another object is to provide a snow removal device for the goggles of hunters and skiers which is portable and always within sight.

Yet another object is to provide a goggle cleaning device which is easy to grip and easy to use.

These and other objects of the invention will in part be obvious, and will in part become apparent from a reading of the instant specification and of the drawings.

The invention accordingly comprises an article possessing the features, properties and the relation of the several elements which will be exemplified into the preferred embodiments and the scope of the invention will be set forth into appended claims.

SUMMARY OF THE INVENTION

The device of this invention is a goggle or eye glasses cleaning device comprising a handle portion having a wiper blade secured thereto along one edge. A retaining means to prevent loss of the device is also disclosed.

BRIEF DESCRIPTION OF THE DRAWINGS

FIG. 7 is a front view showing the use of the instant device.

DESCRIPTION OF THE PREFERRED EMBODIMENT

Figure 1:
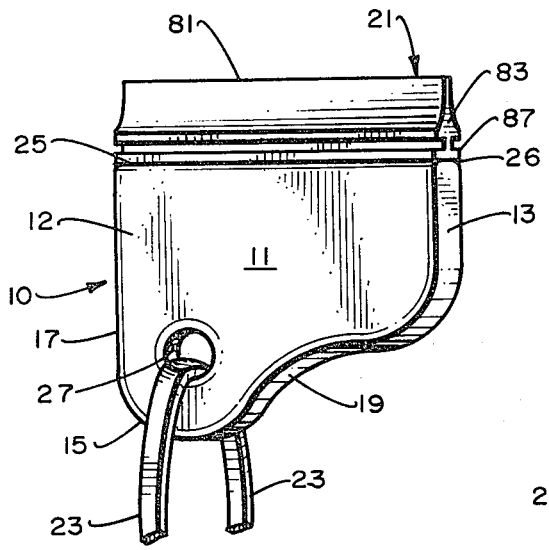
FIG. 1 is a top perspective view of one embodiment of this invention.
Figure 6:
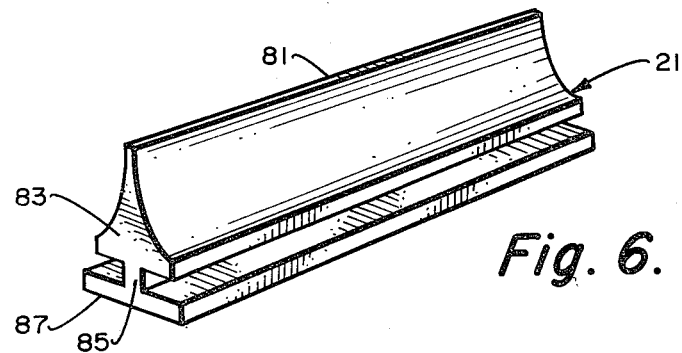
FIG. 6 is a closeup perspective view of one portion of this invention.

In FIG. 1, there is seen one embodiment of the instant device. Device 10 includes a handle portion 11 and a wiper 21. The wiper will be described in detail in connection with the description of FIG. 6. Handle portion 11 includes front and rear walls 12 a right side wall 13, top wall 25. Right wall 13 is seen to extend generally downwardly, then inwardly and downwardly again on some non-critical angle until it meets bottom wall 15. The point at which right wall 13 begins to descend downwardly for the second time, i.e. the indentation, is designated notch 19. This notch is generally contoured to permit a comfortable placement of the index finger therein. Preferably when using the device, the thumb would be positioned along left wall 17.

Bore 27, through the thickness of the handle portion, is adapted to receive retainer cord 23 therein. Retainer cord 23 is sized to fit around the neck of the skier over his parka and hood. Thus, the instant device will be able to hang from the neck of the wearer and be always available, not only available, but capable of being used with gloves or mittens on, as there will be no need to take off a glove to look into a pocket for the instant device.

Obviously the use of the retainer cord 23 makes the instant device more accessible, but of course it is not required. Should a user so desire, the instant device can be stored in the pocket or purse.

Figure 2:
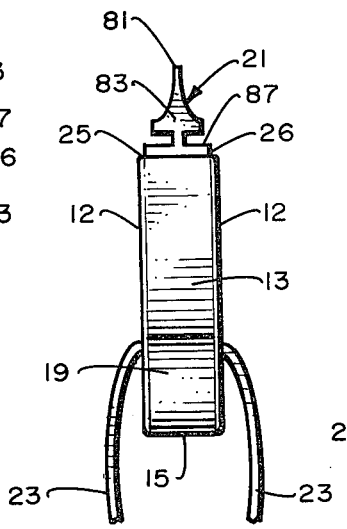
FIG. 2 is a right side elevation thereof.
Figure 3:
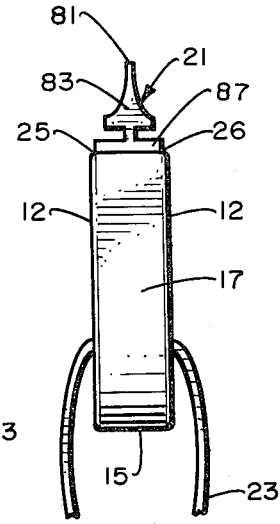
FIG. 3 is a left side elevation thereof.

FIGS. 2 and 3 are elevational views further depicting the side walls and bottom wall of the embodiment of FIG. 1.

Wiper blade 21 is seen to be secured along top wall 25 and the interface of the base 87 of wiper 21 with said wall 25 is designated interface 26.

Figure 4:
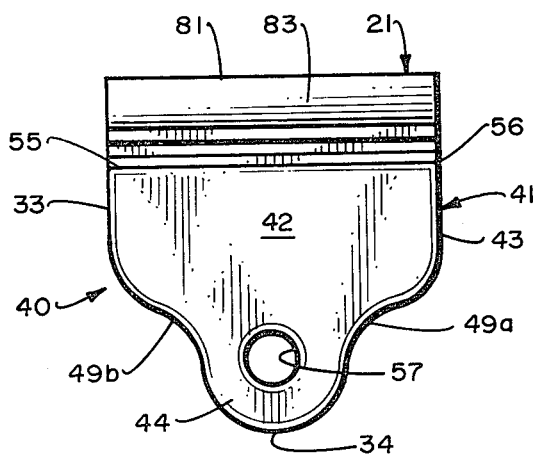
FIG. 4 is a top plan view of a second embodiment of the invention.

In FIG. 4, a second embodiment is shown. This device 40 has a handle portion 41 having front and rear walls 42, side walls 33 and a bottom wall 34. Described another way, handle portion 41 includes an upper portion 43, and a contiguous indented on both sides narrower lower portion 44. Lower portion 44 includes optional through bore 57 adapted to receive a neck chain, not shown. The junction of the lower portion of the handle 44 with the upper portion 43 are designated notches 49a and 49b respectively. These are sized and configured angularly to readily receive the thumb and index finger of the user.

Since the blade used in the embodiment is the same as the one of the embodiment of FIG. 1, it is similarly designated 21. It is further seen that blade 21 is secured to the top wall 55 of device 40 in the same manner as concerns the embodiment of FIG. 1, with the interface being designated 56.

Figure 5:
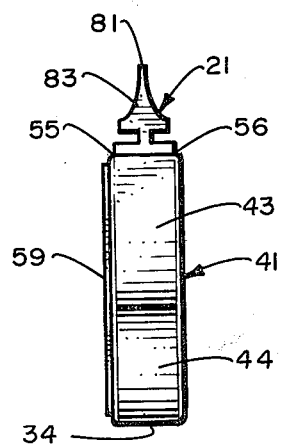
FIG. 5 is a side elevational view of the device of FIG. 4.

FIG. 5 is a right or left side elevational view showing both parts of handle 41, namely upper portion 43 and lower portion 44. FIG. 5 also shows that the thickness of the portion 43 and 44 is preferably the same for ease of manufacturing. Obviously to some, it may be deemed more aesthetic to have the upper portion 43 thicker than lower portion 44 and such is contemplated herein.

It is also within the skill of the art to provide decorative indicia such as the name of the owner, the ski club, and even decorative indicia such as rhinestones, an optional reflective surface 59 such as shown in FIG. 5. Such reflective lenticular sheet is available from the 3M Company and others and is available with a self adhesive back that is pressure sensitive and readily applied. The use of the reflector 59 would aide in the finding of injured or lost skiers.

Elastic wiper 21 in the form shown is a molded or extruded length of flexible elastomeric material, e.g. rubber, and which has a longitudinal wiper portion 81 of a generally V-shaped cross-section which wiping portion is connected to a bulbous section 83 and thence to a narrow neck 85 of reduced diameter. Backer strip 87 can be integral and of the same material, or it can be of a different material such as polycarbonate impregnated with carbon flash, as is described in U.S. Pat. No. 4,009,503, issued to Bernard Sharp and incorporated herein by reference, specifically as to columns 3, lines 21 through column 4, line 6. In said patent, the narrow neck 85 is inserted into a backer of a specific construction. Satisfactory results are obtainable when backer 87 is rubber.

FIG. 7 illustrates the use of the instant device, either embodiment, the one shown being that of FIG. 4, to clean the lense 73 of goggles 71. Frame area 72 is left untouched or it can also be wiped free of snow 78 as the situation dictates. Note the presence of retainer cord 93 here shown, merely knotted in place rather than extending through bore 27 to form a circle as is illustrated in FIG. 1. Here, a construction similar to a watch fob is employed. The thumb and index finger of the operator are designated 75 and 77 respectively.

One merely moves the blade wiper 21 in a straight line across or downwardly much like the use of a squeegee to clean the lens.

The body portion can be made of any suitable material such as wood that has been sealed to make it water proof, as by paint lacquer or varnish or plastic, such as styrene or nylon, which is readily injection moulded. If moulded, the body can be hollow or solid. Metal is not recommended since in cold weather, bare fingers i.e. without gloves, may tend to stick to same, a most undesireable condition. Generally the body portion should be about ½ inch thick and about 1½ to 2½ inches wide by 1 to 2 inches high.

Blade wiper 21 may be secured to the body portion by any suitable adhesive. If desired, the backer 87 can be stapled to the top walls 25 or 55 respectively, especially if said back is of a resilient material.

The retainer cord as has been mentioned above in passing, may be secured in various fashions, none of which is more acceptable than any other. One method is a continuous loop with a single knot, thus forming a necklace. Another is to insert cord 23 through the bord 27 or 57 and tie a knot at one end, and then tie a slip knot at the other end to secure the cord to the wearer's wrist or belt. Such knot tieing is within the skill of the art.

I claim:

1. A wiping apparatus for the removal of snow and debris from goggles and eyeglass lenses comprising:
   a handle portion having a pair of opposed front and rear walls, a top wall, a bottom wall, and a pair of opposed side walls, at least one of said side walls being indented and adapted to receive the finger of an operator during time of use, said handle portion being about ½ inches thick, about 1¼ to 2¼ inches wide, and about 1 to 2 inches high,
   an elastic wiper blade secured to the long dimension of said top wall thereof, said blade being sized in elongation such that the entire blade contacts the lens during removal process,
   said apparatus including a through bore in the handle portion from the front wall to the rear wall,
   a light reflective lenticular surface on one of the opposed front and rear walls, said through bore also penetrating said reflective surface,
   and a retainer cord adapted to encircle the neck of a wearer secured through said throughbore.

2. The device of claim 1 wherein both of said side walls are indented and adapted to receive fingers of the operator.

* * * * *